(12) United States Patent
Yang et al.

(10) Patent No.: US 11,538,418 B2
(45) Date of Patent: Dec. 27, 2022

(54) VISABLE LIGHT COMMUNICATION DISPLAY DEVICE AND DRIVING METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jianguang Yang, Beijing (CN); Xiuyun Chen, Beijing (CN); Zongze He, Beijing (CN); Liang Zhang, Beijing (CN); Zhenghua Lu, Beijing (CN); Yuxuan Chen, Beijing (CN); Shuo Li, Beijing (CN); Feng Long, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 700 days.

(21) Appl. No.: 16/339,919

(22) PCT Filed: Oct. 19, 2018

(86) PCT No.: PCT/CN2018/110948
§ 371 (c)(1),
(2) Date: Apr. 5, 2019

(87) PCT Pub. No.: WO2019/179090
PCT Pub. Date: Sep. 26, 2019

(65) Prior Publication Data
US 2021/0366404 A1 Nov. 25, 2021

(30) Foreign Application Priority Data
Mar. 22, 2018 (CN) .......................... 201810239087.6

(51) Int. Cl.
*G09G 3/3275* (2016.01)
*H04B 10/116* (2013.01)

(52) U.S. Cl.
CPC ......... *G09G 3/3275* (2013.01); *H04B 10/116* (2013.01); *G09G 2310/08* (2013.01); *G09G 2370/18* (2013.01)

(58) Field of Classification Search
CPC .................................................. G09G 2370/18
See application file for complete search history.

(56) References Cited

U.S. PATENT DOCUMENTS

2009/0002265 A1   1/2009   Kitaoka et al.
2011/0044695 A1*  2/2011   Jun .................. H04B 10/116
                                                    398/130
(Continued)

FOREIGN PATENT DOCUMENTS

CN    1989716 A    6/2007
CN    202473188 U  10/2012
(Continued)

OTHER PUBLICATIONS

First Office Action for Chinese Application No. 201810239087.6, dated Jun. 17, 2019, 10 Pages.
(Continued)

*Primary Examiner* — William Boddie
*Assistant Examiner* — Bipin Gyawali
(74) *Attorney, Agent, or Firm* — Brooks Kushman P.C.

(57) ABSTRACT

A display device and a driving method are provided. The display device includes a display panel and a control IC. The display panel includes a plurality of light-emitting elements. The control IC is configured to control the plurality of light-emitting elements to be turned on at a first frequency so as to display display-related data, and control at least two light-emitting elements of the plurality of light-emitting
(Continued)

elements to be turned on and off at a second frequency greater than the first frequency so as to transmit visible light data.

11 Claims, 5 Drawing Sheets

(56) References Cited

U.S. PATENT DOCUMENTS

| | | | |
|---|---|---|---|
| 2011/0063510 A1 | 3/2011 | Lee et al. | |
| 2016/0238439 A1* | 8/2016 | Chu | G01J 1/44 |
| 2017/0155447 A1* | 6/2017 | Yin | G02B 26/0833 |
| 2017/0229074 A1 | 8/2017 | Takehara | |
| 2018/0145116 A1* | 5/2018 | Lee | G09G 3/32 |
| 2019/0007136 A1 | 1/2019 | Ye et al. | |
| 2022/0077229 A1* | 3/2022 | Yu | G09G 3/32 |

FOREIGN PATENT DOCUMENTS

| | | |
|---|---|---|
| CN | 104333418 A | 2/2015 |
| CN | 106330313 A | 1/2017 |
| CN | 107404354 A | 11/2017 |
| CN | 107579775 A | 1/2018 |
| CN | 107611155 A | 1/2018 |
| CN | 108399885 A | 8/2018 |
| JP | 2004328632 A | 11/2004 |
| JP | 2006319545 A | 11/2006 |
| KR | 1020110029733 A | 3/2011 |

OTHER PUBLICATIONS

International Search Report and Written Opinion for Application No. PCT/CN2018/110948, dated Jan. 21, 2019, 11 Pages.

* cited by examiner

Fig. 7 controlling a plurality of light-emitting elements of a display panel to be turned on at a first frequency, so as to display display-related data, and controlling at least two light-emitting elements of the plurality of light-emitting elements to be turned on and off at a second frequency greater than the first frequency, so as to transmit visible light data 110

Fig. 8

VISABLE LIGHT COMMUNICATION DISPLAY DEVICE AND DRIVING METHOD

CROSS-REFERENCE TO RELATED APPLICATIONS

This application is the U.S. national phase of PCT Application No. PCT/CN2018/110948 filed on Oct. 19, 2018, which claims priority to Chinese Patent Application No. 201810239087.6 filed on Mar. 22, 2018, which are incorporated herein by reference in their entireties.

TECHNICAL FIELD

The present disclosure relates to the field of display technology, in particular to a display device and a driving method.

BACKGROUND

Visible light communication (VLC) technology refers to a communication technology of transmitting information through light-and-dark flickering signals generated by a light-emitting diode (LED) at a high speed.

SUMMARY

In one aspect, the present disclosure provides in some embodiments a display device, including a display panel and a control integrated circuit (IC). The display panel includes a plurality of light-emitting elements. The control IC is configured to control the plurality of light-emitting elements to be turned on at a first frequency so as to display display-related data, and control at least two light-emitting elements of the plurality of light-emitting elements to be turned on and off at a second frequency greater than the first frequency so as to transmit visible light data.

In a possible embodiment of the present disclosure, the first frequency is $(1\sim15)\times10^4$ Hz, and the second frequency is $(1\sim6)\times10^7$ Hz.

In a possible embodiment of the present disclosure, the display panel includes a display region which is divided into a plurality of display sub-regions, and the control IC is further configured to control light-emitting elements in each display sub-region to transmit the visible light data independently.

In a possible embodiment of the present disclosure, the display panel includes a display region which includes a pixel region where the plurality of light-emitting elements is located and a non-pixel region surrounding each light-emitting element, and an optical signal detector for detecting a visible light signal is arranged in the non-pixel region. The control IC is connected to the optical signal detector, and further configured to receive a detection signal generated by the optical signal detector in accordance with the detected visible light signal, and identify the detection signal.

In a possible embodiment of the present disclosure, the display panel further includes a retaining wall arranged between the optical signal detector and at least one light-emitting element and having a height greater than or equal to that of the at least one light-emitting element.

In a possible embodiment of the present disclosure, each light-emitting element is an LED, an organic light-emitting diode (OLED) or a micro LED.

In a possible embodiment of the present disclosure, the control IC includes an optical signal processor, a timing controller and a data driver. The optical signal processor is configured to input the visible light data for visible light communication to the timing controller. The timing controller is configured to apply a first control signal to the plurality of light-emitting elements so as to control the plurality of light-emitting elements to be turned on at the first frequency, and apply a second control signal to at least two light-emitting elements of the plurality of light-emitting elements in accordance with the visible light data so as to control the at least two light-emitting elements of the plurality of light-emitting elements to be turned on and off at the second frequency. The data driver is configured to input the display-related data to the plurality of light-emitting elements.

In another aspect, the present disclosure provides in some embodiments a method for driving the above-mentioned display device, including controlling a plurality of light-emitting elements of a display panel to be turned on at a first frequency, so as to display display-related data, and controlling at least two light-emitting elements of the plurality of light-emitting elements to be turned on and off at a second frequency greater than the first frequency, so as to transmit visible light data.

In a possible embodiment of the present disclosure, the display panel includes a display region which is divided into a plurality of display sub-regions. The controlling the at least two light-emitting elements of the plurality of light-emitting elements to be turned on and off at the second frequency greater than the first frequency, to transmit visible light data includes controlling light-emitting elements in each display sub-region to transmit the visible light data independently.

In a possible embodiment of the present disclosure, the display panel includes a display region which includes a pixel region where the plurality of light-emitting elements is located and a non-pixel region surrounding each light-emitting element, and an optical signal detector for detecting a visible light signal is arranged in the non-pixel region. The method further includes receiving a detection signal generated by the optical signal detector in accordance with the detected visible light signal, and identifying the detection signal.

In yet another aspect, the present disclosure provides in some embodiments a display device, including a memory, a processor, and a computer program stored in the memory and executed by the processor. The processor is configured to execute the computer program so as to implement the above-mentioned method.

In still yet another aspect, the present disclosure provides in some embodiments a non-transitory computer-readable storage medium storing therein a computer program. The computer program is executed by a processor so as to implement the steps of the above-mentioned method.

DETAILED DESCRIPTION

In the related art, usually the VLC is achieved through a single LED, so the VLC technology has a small application range and the amount of information to be transmitted is limited.

Figure 1:
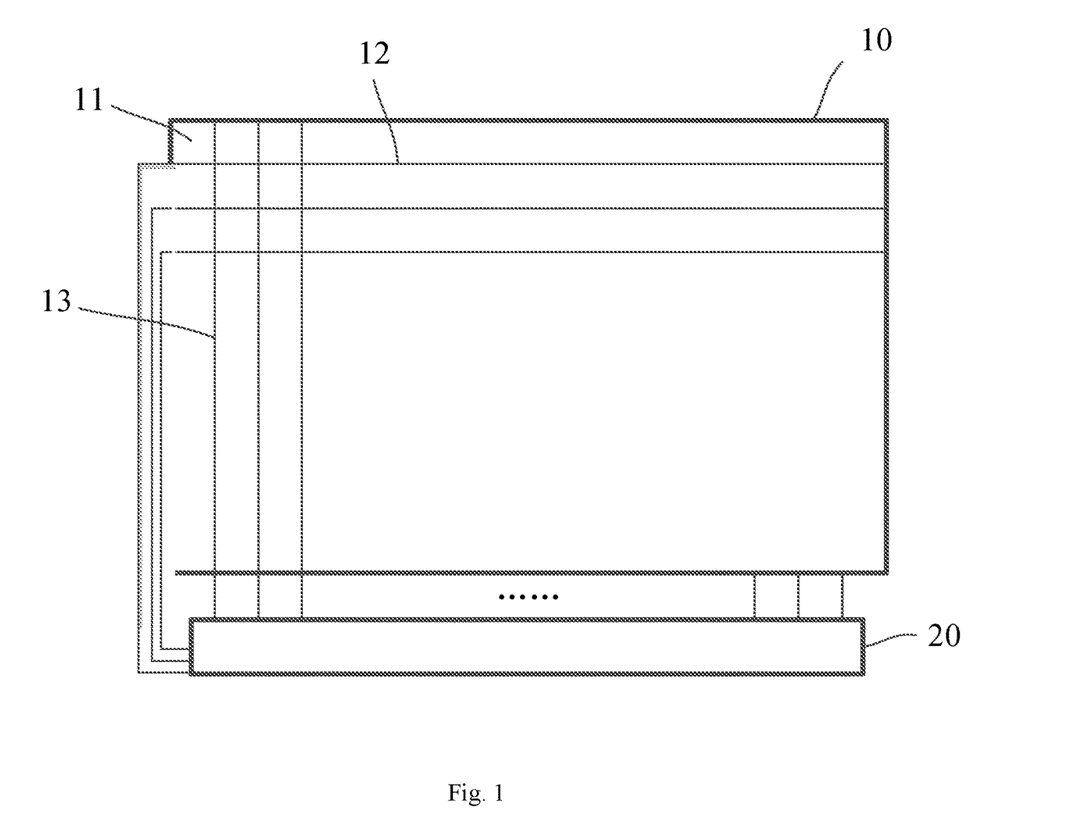
FIG. 1 is a schematic view showing a display device according to one embodiment of the present disclosure.

The present disclosure provides in some embodiments a display device which, as shown in FIG. 1, includes a display panel 10 and a control IC 20. The display panel 10 includes a plurality of light-emitting elements 11. The control IC 20 is configured to control the plurality of light-emitting elements 11 to be turned on at a first frequency so as to display display-related data, and control at least two light-emitting elements 11 of the plurality of light-emitting elements 11 to be turned on and off at a second frequency greater than the first frequency so as to transmit visible light data.

After the plurality of light-emitting elements 11 has been turned on at the first frequency, when the at least two light-emitting elements are turned on and off at the second frequency, it is impossible for human eyes to identify a situation where the light-emitting elements are turned off at the second frequency due to the persistence of vision. Hence, for the human eyes, when the at least two light-emitting elements are turned on and off at the second frequency, it seems that they are still in an on state.

According to the display device in the embodiments of the present disclosure, a VLC function is integrated into the display device, so as to achieve the VLC while displaying an image, thereby to enlarge the application range of the VLC technology. In addition, due to the huge number of light-emitting elements for the display device, it is able to transmit a large amount of information about the visible light data.

In some embodiments of the present disclosure, the display panel 10 may include a plurality of light-emitting elements 11, and each light-emitting element 11 may be a subpixel.

In some embodiments of the present disclosure, as shown in FIG. 1, the plurality of light-emitting elements 11 may be arranged in an array form, i.e., in rows and columns.

In some embodiments of the present disclosure, the plurality of light-emitting elements 11 may be arranged in any other form.

In some embodiments of the present disclosure, as shown in FIG. 1, the display panel 10 may further include a plurality of gate lines 12 and a plurality of data lines 13 so as to define a plurality of subpixel regions (i.e., every two adjacent gate lines and every two adjacent data lines may define a subpixel region), and each light-emitting element 11 may be arranged in one subpixel region. Each gate line 12 may be electrically connected to the light-emitting elements 11 in one row and configured to apply a first control signal to the light-emitting elements 11 in the row so as to control the light-emitting elements 11 in the row to be turned on or off. Each data line 13 may be electrically connected to the light-emitting elements 11 in one column and configured to provide the corresponding display-related data to the light-emitting elements 11 in the column.

In the embodiments of the present disclosure, the control IC 20 may be connected to the gate lines 12 and the data lines 13, and configured to apply the first control signal to each gate line 12 so as to control the light-emitting elements 11 in each row to be turned on at the first frequency, and provide the display-related data to each data line 13 so as to display a content corresponding to the display-related data. In addition, the control IC 20 is further configured to apply a second control signal to the gate line 12 connected to the light-emitting elements (in one row) which have been currently turned on in accordance with the to-be-transmitted visible light data, so as to control the light-emitting elements 11 to be turned on and off at the second frequency, thereby to transmit the visible light data.

Figure 2:
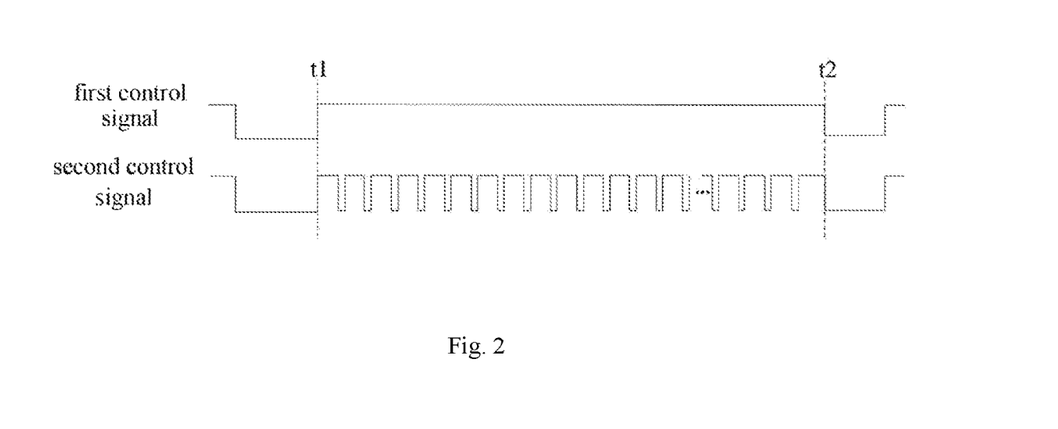
FIG. 2 is a schematic view showing a first control signal and a second control signal applied by a control IC to a display panel according to one embodiment of the present disclosure.

FIG. 2 shows the first control signal and the second control signal applied by the control IC to the display panel. As shown in FIG. 1 in conjunction with FIG. 2, the control IC 20 may apply the first control signal to the display panel 10, so as to control the light-emitting elements 11 in one row to be turned on at a time point t1 and turned off at a time point t2, so as to display the display-related data. In addition, the control IC 20 may apply the second control signal to the display panel 10, so as to control the light-emitting elements 11 in the one row to be turned on and off frequently at the second frequency within a time period from t1 to t2, thereby to transmit the visible light data. The second frequency is greater than the first frequency, so a normal display function of the light-emitting elements 11 in the row may not be adversely affected when the light-emitting elements 11 are turned on and off at the second frequency.

In some embodiments of the present disclosure, the first frequency may be $(1\sim15)\times10^4$ Hz, and the second frequency may be $(1\sim6)\times10^7$ Hz. For example, the first frequency may be $3\times10^4$ Hz, and the second frequency may be $3\times10^7$ Hz, i.e., the second frequency may be far greater than the first frequency. Hence, when the light-emitting elements 11 in the row are turned on and off at the second frequency, the normal display function of the light-emitting elements 11 may not be adversely affected.

In some embodiments of the present disclosure, during the transmission of the visible light data, a binary code "1" represents that the light-emitting element 11 has been turned on, and a binary code "0" represents that the light-emitting element 11 has been turned off.

In some other embodiments of the present disclosure, during the transmission of the visible light data, a binary code "1" represents that the light-emitting element 11 has been turned off, and a binary code "0" represents that the light-emitting element 11 has been turned on.

Figure 3:
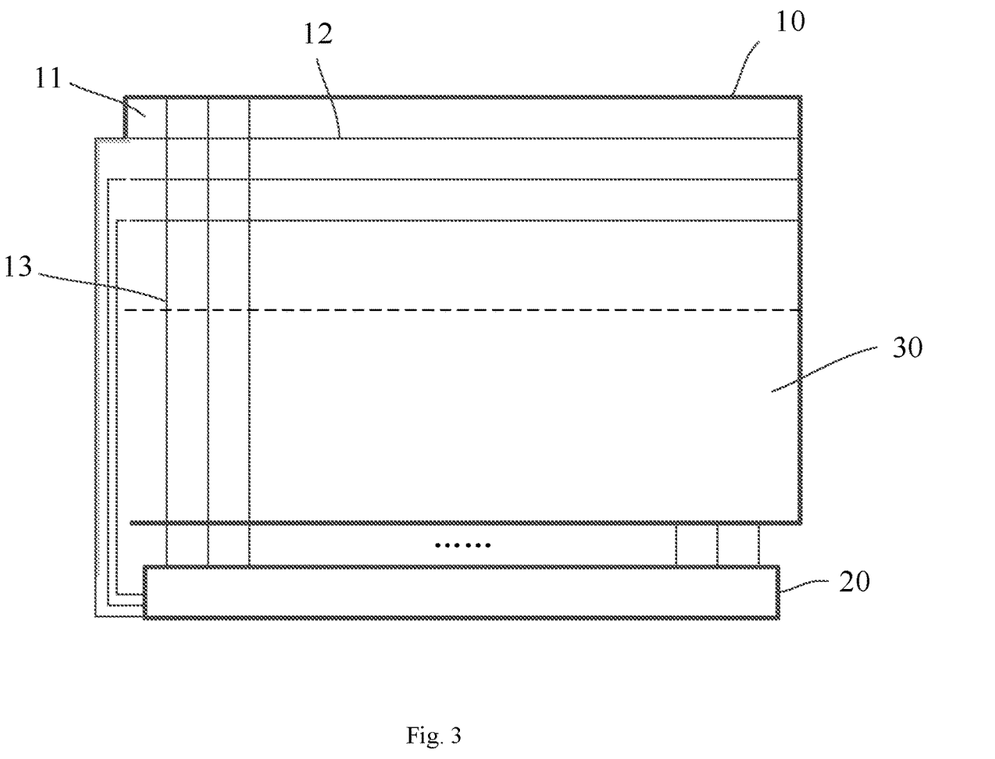
FIG. 3 is another schematic view showing the display device according to one embodiment of the present disclosure.
Figure 4:
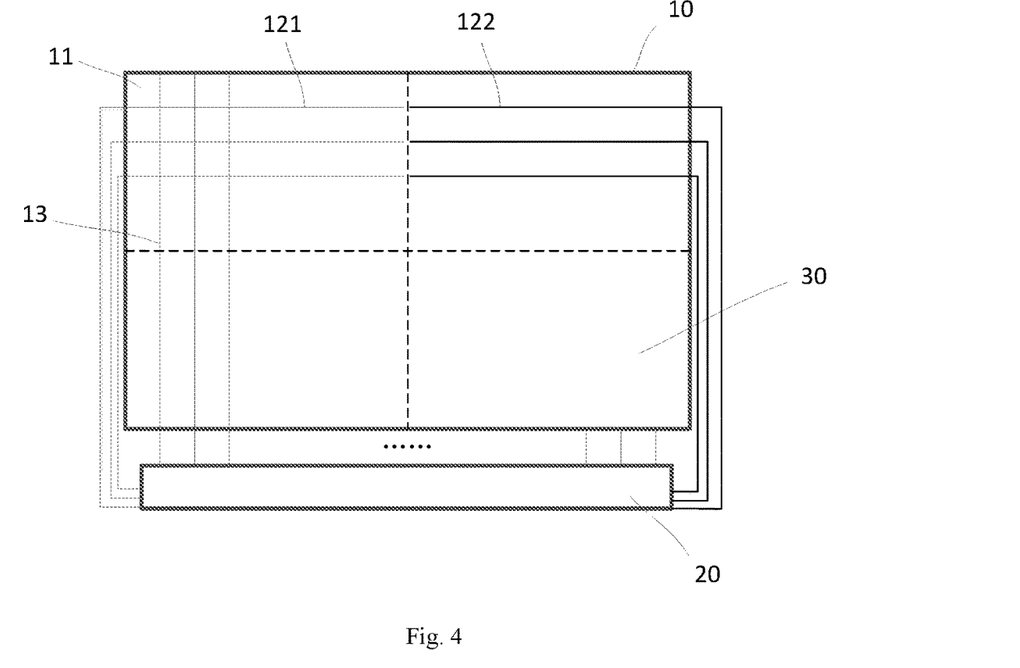
FIG. 4 is yet another schematic view showing the display device according to one embodiment of the present disclosure.

In some embodiments of the present disclosure, in order to increase a volume of the data to be transmitted, as shown in FIGS. 3 and 4, a display region of the display panel 10 may be divided into a plurality of display sub-regions 30, and the control IC 20 may control the light-emitting elements 11 in each display sub-region 30 to transmit the visible light data independently.

In some embodiments of the present disclosure, as shown in FIG. 3, the display panel 10 may include a display region which is divided into two display sub-regions 30, i.e., an upper display sub-region and a lower display sub-region, and the control IC 20 may control the light-emitting elements 11 in each display sub-region to transmit the visible light data independently.

In some other embodiments of the present disclosure, as shown in FIG. 4, the display panel 10 may include a display region which is divided into four display regions 30, and the control IC 20 may control the light-emitting elements 11 in each display sub-region to transmit the visible light data independently.

In some embodiments of the present disclosure, as shown in FIG. 4, in order to control the light-emitting elements 11 in each of the four display sub-regions to transmit the visible light data independently, each gate line may include a first gate line 121 and a second gate line 22 connected to the control IC 20 respectively and separately, and the control IC 20 may control the light-emitting elements 11 electrically connected to the first gate line 21 and the light-emitting elements 11 electrically connected to the second gate line 122 separately, so as to transmit the visible light data independently.

According to the display device in the embodiments of the present disclosure, it is able to transmit the visible light data when the display-related data is displayed on the display panel.

In some embodiments of the present disclosure, the display device may further include an optical signal detector configured to receive visible light data from a visible light processing device. Hence, the display device may have a function of transmitting the visible light data and a function of receiving the visible light data from the other visible light processing device at the same time, so that the display device may communicate with the other visible light processing device.

Figure 5:
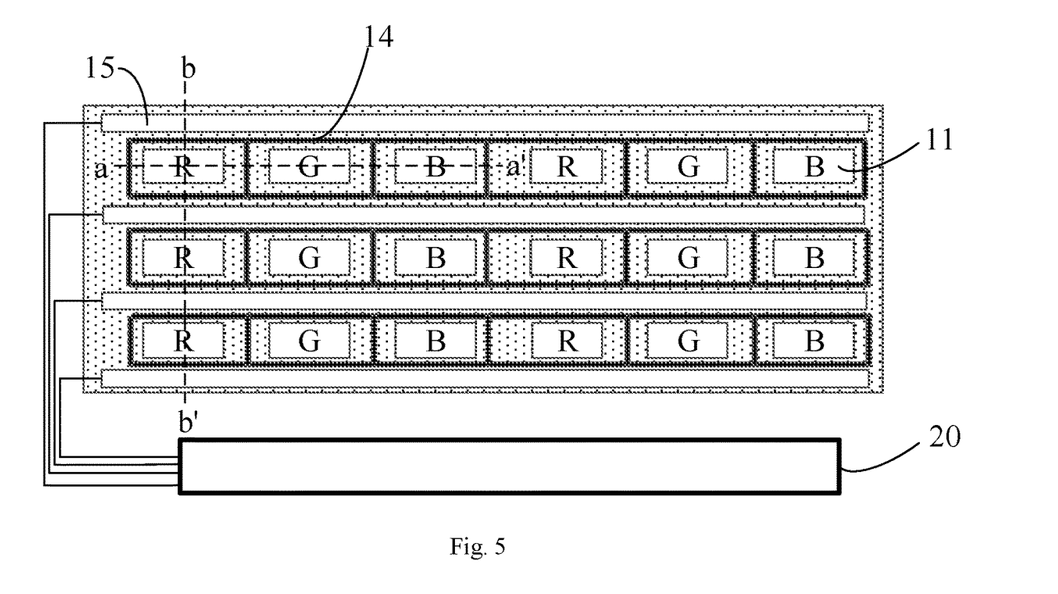
FIG. 5 is still yet another schematic view showing the display device according to one embodiment of the present disclosure.

In some embodiments of the present disclosure, as shown in FIG. 5, the display region of the display panel 10 may include a pixel region where the light-emitting elements 11 are arranged and a non-pixel region surrounding each light-emitting element 11. The optical signal detector 15 for receiving a visible light signal may be arranged in the non-pixel region. The control IC 20 may be connected to the optical signal detector 15, so as to receive a detection signal generated by the optical signal detector 15 in accordance with the detected visible light signal, and identify the detection signal.

In some embodiments of the present disclosure, as shown in FIG. 5, the display panel may include red light-emitting elements R, green light-emitting elements G and blue light-emitting elements B. A region where these light-emitting elements 11 are located may be the pixel region, and a region surrounding the pixel region may be the non-pixel region, and the optical signal detector 15 may be arranged in the non-pixel region.

In some embodiments of the present disclosure, the optical signal detector 15 may be a photosensitive diode. The photosensitive diode may be manufactured in a simple manner, so the manufacture cost thereof is relatively low.

In some embodiments of the present disclosure, in order to prevent the reception of the visible light from the other visible light processing device by the optical signal detectors surrounding each light-emitting element from being adversely affected by a light beam from the light-emitting element, as shown in FIG. 5, the display panel may further include a retaining wall 14 arranged between the light-emitting element 11 and the optical signal detector 15. The retaining wall 14 may have a height greater than or equal to a height of the light-emitting element 11, so as to ensure the light beam from the light-emitting element 11 to be transmitted vertically, thereby to prevent the reception of the light beam from the other device by the optical signal detector 15 from being adversely affected by light from the light-emitting element 11.

In some embodiments of the present disclosure, as shown in FIG. 5, the retaining wall may be arranged in such a manner as to surround each light-emitting element 11, i.e., each light-emitting element 11 may be enclosed by the retaining wall 14.

Figure 6A:
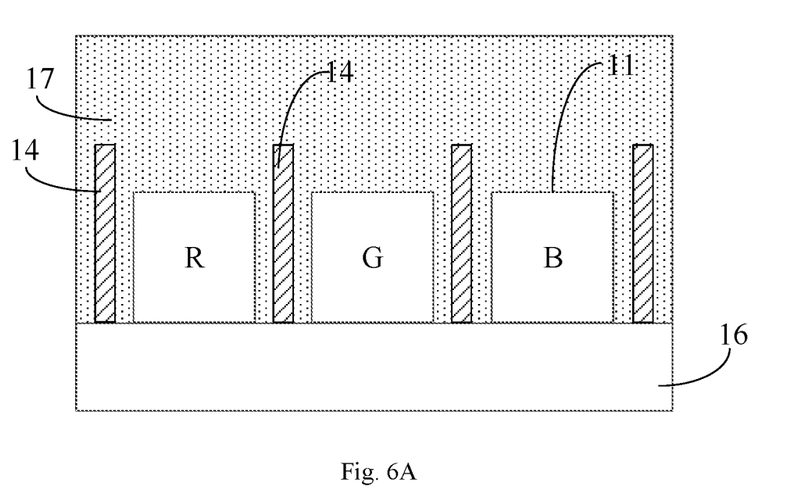
FIG. 6A is a sectional view of the display device along line a-a' in FIG. 5.
Figure 6B:
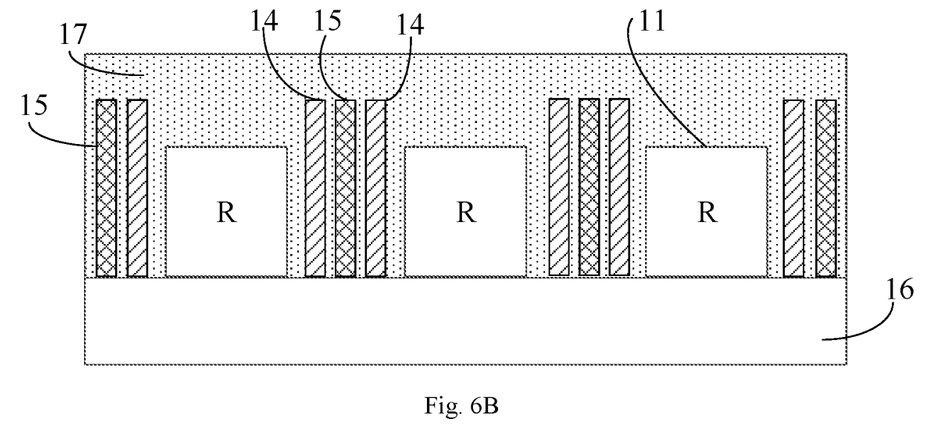
FIG. 6B is a sectional view of the display device along line b-b' in FIG. 5.

FIG. 6A is a sectional view of the display device along line a-a' in FIG. 5, and FIG. 6B is a sectional view of the display device along line b-b' in FIG. 5. As shown in FIGS. 6A and 6B, 16 represents a base substrate, and 17 represents a protection layer. The light-emitting elements 11, the retaining wall 14 and the optical signal detectors 15 may be arranged on the base substrate 16, and the protection layer 17 may be arranged in such a manner as to surround each light-emitting element 11.

Figure 7:
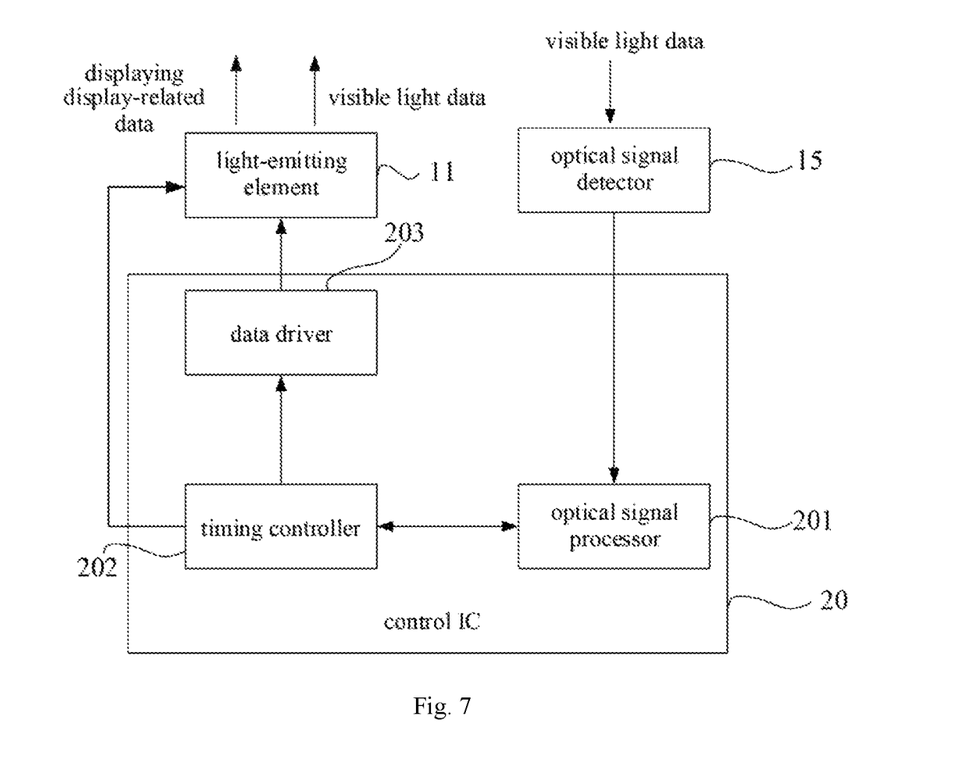
FIG. 7 is still yet another schematic view showing the display device according to one embodiment of the present disclosure.

In some embodiments of the present disclosure, as shown in FIG. 7, the control IC 20 may include an optical signal processor 201, a timing controller (TCON) 202 and a data driver 203. The optical signal processor 201 is configured to input the visible light data for visible light communication to the timing controller 202. The timing controller 202 is configured to apply the first control signal to the plurality of light-emitting elements 11 so as to control the plurality of light-emitting elements to be turned on at the first frequency, and apply the second control signal to the plurality of light-emitting elements 11 to control at least two of the plurality of light-emitting elements to be turned on and off at the second frequency based on the visible light data. The data driver (source) 203 is configured to input the display-related data to the plurality of light-emitting elements 11.

The optical signal processor 201 is further configured to receive the detection signal from the optical signal detector 15, and identify the detection signal.

In some embodiments of the present disclosure, each light-emitting element may be an LED, an OLED or a micro LED.

Figure 8:
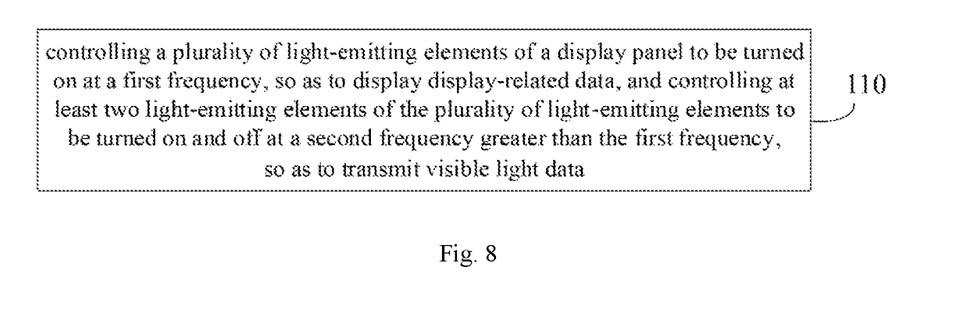
FIG. 8 is a flow chart of a method for driving the display device according to one embodiment of the present disclosure.

The present disclosure further provides in some embodiments a method for driving the above-mentioned display device. As shown in FIG. 8, the method may include Step 110 of controlling a plurality of light-emitting elements of a display panel to be turned on at a first frequency, so as to display display-related data, and controlling at least two light-emitting elements of the plurality of light-emitting elements to be turned on and off at a second frequency greater than the first frequency, so as to transmit visible light data.

According to the method in the embodiments of the present disclosure, a VLC function is integrated into the display device, so as to achieve the VLC while displaying an image, thereby to enlarge the application range of the VLC technology. In addition, due to the huge number of light-emitting elements for the display device, it is able to transmit a large amount of information about the visible light data.

In some embodiments of the present disclosure, in order to increase a volume of data to be transmitted, a display region of the display panel may be divided into a plurality of display sub-regions. The controlling the at least two light-emitting elements of the plurality of light-emitting elements to be turned on and off at the second frequency so as to transmit the visible light data may include controlling the light-emitting elements in each display sub-region to transmit the visible light data independently.

According to the method in the embodiments of the present disclosure, it is able for the light-emitting elements to transmit the visible light data while displaying an image.

In some embodiments of the present disclosure, the display device includes an optical signal detector for receiving visible light data from another visible light processing device. Hence, the display device may have a function of transmitting the visible light data and a function of receiving the visible light data from the other visible light processing device at the same time, so that the display device may communicate with the other visible light processing device.

In some embodiments of the present disclosure, the display panel may include a display region includes a pixel region where the plurality of light-emitting elements is located and a non-pixel region surrounding each light-emitting element, and an optical signal detector for detecting a visible light signal may be arranged in the non-pixel region.

In some embodiment of the present disclosure, the method may further include receiving a detection signal generated by the optical signal detector in accordance with the detected visible light signal, and identifying the detection signal.

The present disclosure further provides in some embodiments a display device including a memory, a processor, and a computer program stored in the memory and executed by the processor. The processor is configured to execute the computer program so as to implement the above-mentioned method.

The present disclosure further provides in some embodiments a computer-readable storage medium storing therein a computer program. The computer program is executed by a processor so as to implement the steps of the above-mentioned method.

The computer-readable storage medium may include volatile or nonvolatile, mobile or immobile storage medium capable of storing therein information using any method or technique. The information may be a computer-readable instruction, a data structure, a program or any other data. The computer-readable storage medium may include, but not limited to, a Random Access Memory (e.g., Phase Change Random Access Memory (PRAM), SRAM or Dynamic Random Access Memory (DRAM)), a Read Only Memory (ROM) (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device.

What is claimed is:

1. A display device, comprising a display panel and a control integrated circuit (IC), wherein the display panel comprises a plurality of light-emitting elements, the control IC is configured to control the plurality of light-emitting elements to be turned on at a first frequency to display display-related data, and control at least two light-emitting elements of the plurality of light-emitting elements to be turned on and off at a second frequency greater than the first frequency to transmit visible light data,
wherein the display panel further comprises a plurality of retaining walls and an optical signal detector for detecting a visible light signal, wherein one retaining wall is arranged between the optical signal detector and an adjacent light-emitting element, there is at least one retaining wall arranged at each of two sides of the optical signal detector, there is at least one retaining wall arranged between two adjacent light-emitting elements, and the retaining walls have a height greater than or equal to that of at least one light-emitting element,
wherein two retaining walls and the optical signal detector are arranged between two adjacent light-emitting elements configured to emit a same color light.

2. The display device according to claim 1, wherein the first frequency is $(1\sim15)\times10^4$ Hz, and the second frequency is $(1\sim6)\times10^7$ Hz.

3. The display device according to claim 1, wherein the display panel comprises a display region which is divided into a plurality of display sub-regions, and the control IC is further configured to control light-emitting elements in each display sub-region to transmit the visible light data independently.

4. The display device according to claim 1, wherein the display panel comprises a display region which comprises a pixel region where the plurality of light-emitting elements is located and a non-pixel region surrounding each light-emitting element, wherein the optical signal detector is arranged in the non-pixel region, wherein the control IC is connected to the optical signal detector, and is further configured to receive a detection signal generated by the optical signal detector in accordance with the detected visible light signal, and identify the detection signal.

5. The display device according to claim 1, wherein each light-emitting element is a light-emitting diode (LED), an organic light-emitting diode (OLED) or a micro LED.

6. The display device according to claim 1, wherein the control IC comprises an optical signal processor, a timing controller and a data driver;
the optical signal processor is configured to input the visible light data for visible light communication to the timing controller;
the timing controller is configured to apply a first control signal to the plurality of light-emitting elements to control the plurality of light-emitting elements to be turned on at the first frequency, and apply a second control signal to at least two light-emitting elements of the plurality of light-emitting elements in accordance with the visible light data to control the at least two light-emitting elements of the plurality of light-emitting elements to be turned on and off at the second frequency; and
the data driver is configured to input the display-related data to the plurality of light-emitting elements.

7. A method for driving the display device according claim 1, comprising controlling a plurality of light-emitting elements of a display panel to be turned on at a first frequency, to display display-related data, and controlling at least two light-emitting elements of the plurality of light-emitting elements to be turned on and off at a second frequency greater than the first frequency, to transmit visible light data.

8. The method according to claim 7, wherein the display panel comprises a display region which is divided into a plurality of display sub-regions, and the controlling the at least two light-emitting elements of the plurality of light-emitting elements to be turned on and off at the second frequency greater than the first frequency, to transmit visible light data comprises controlling light-emitting elements in each display sub-region to transmit the visible light data independently.

9. The method according to claim 7, wherein the display panel comprises a display region which comprises a pixel region where the plurality of light-emitting elements is located and a non-pixel region surrounding each light-emitting element, and an optical signal detector for detecting a visible light signal is arranged in the non-pixel region, wherein the method further comprises receiving a detection signal generated by the optical signal detector in accordance with the detected visible light signal, and identifying the detection signal.

10. A display device, comprising a memory, a processor, and a computer program stored in the memory and executed by the processor, wherein the processor is configured to execute the computer program so as to implement the method according to claim 7.

11. A non-transitory computer-readable storage medium storing therein a computer program, wherein the computer program is executed by a processor so as to implement the steps of the method according to claim 7.

* * * * *